US008706177B2

(12) United States Patent
Norris et al.

(10) Patent No.: US 8,706,177 B2
(45) Date of Patent: Apr. 22, 2014

(54) POCKET PAGER PROTECTOR (71) Applicant: Wireless Resident Nurse Alert Technology, Inc., Nepean (CA)

(72) Inventors: Joseph Norris, Nepean (CA); Marc Lefebvre, Ottawa (CA)

(73) Assignee: Wireless Resident Nurse Alert Technology, Inc., Ottawa, Ontario (CA)

( * ) Notice: Subject to any disclaimer, the term of this patent is extended or adjusted under 35 U.S.C. 154(b) by 0 days.

(21) Appl. No.: 13/938,554

(22) Filed: Jul. 10, 2013

(65) Prior Publication Data

US 2014/0024419 A1 Jan. 23, 2014

Related U.S. Application Data (63) Continuation-in-part of application No. 12/702,548, filed on Feb. 9, 2010, now abandoned, which is a continuation-in-part of application No. 11/354,074, filed on Feb. 15, 2006, now abandoned.

(30) Foreign Application Priority Data

Aug. 29, 2005 (CA) ...................................... 2517541

(51) Int. Cl.
*H04M 1/00* (2006.01)
(52) U.S. Cl.
USPC ..................................... 455/575.8; 455/575.1
(58) Field of Classification Search
USPC ...................................................... 455/575.8
See application file for complete search history.

(56) References Cited

U.S. PATENT DOCUMENTS

| 4,746,043 | A | * | 5/1988 | Booker ......................... 224/219 |
| 4,836,256 | A | | 6/1989 | Meliconi |
| 4,901,852 | A | | 2/1990 | King |
| 5,175,873 | A | * | 12/1992 | Goldenberg et al. ......... 455/351 |
| 6,031,524 | A | | 2/2000 | Kunert |
| 6,068,119 | A | | 5/2000 | Derr et al. |
| D455,730 | S | | 4/2002 | Hakim-Nelson |
| 6,456,487 | B1 | * | 9/2002 | Hetterick .................... 361/679.3 |
| 6,646,864 | B2 | * | 11/2003 | Richardson ................ 361/679.3 |
| 6,659,274 | B2 | | 12/2003 | Enners |
| 6,983,130 | B2 | * | 1/2006 | Chien et al. .................. 455/90.3 |
| 7,180,735 | B2 | * | 2/2007 | Thomas et al. ........... 361/679.56 |
| 7,520,389 | B2 | * | 4/2009 | Lalouette ...................... 206/722 |
| 2006/0061950 | A1 | * | 3/2006 | Richardson et al. .......... 361/683 |

FOREIGN PATENT DOCUMENTS

WO    WO-03/101245    12/2003

* cited by examiner

*Primary Examiner* — David Bilodeau
(74) *Attorney, Agent, or Firm* — B. Aaron Schulman, Esq.; Stites & Harbison, PLLC.

(57) ABSTRACT

A shock and water resistant wireless pager enclosure, and a tamper-proof lockable enclosure system. The enclosure comprises a bottom container, which supports a transparent film, secured by a cover hinged to the bottom container. The enclosure system comprises an enclosure cover provided with securing members which lockingly engage the bottom container. A lock release tool comprises latching means for engagement with the securing members, and a cam and cam followers which operate on the latching means to pull the securing members outwards to release the locked engagement.

12 Claims, 12 Drawing Sheets

POCKET PAGER PROTECTOR

CROSS-REFERENCE TO RELATED APPLICATIONS

This application is a continuation-in-part of U.S. patent application Ser. No. 12/702,548, filed on Feb. 9, 2010, which was a continuation-in-part of U.S. patent application Ser. No. 11/354,074 entitled Pocket Pager Protector, filed on Feb. 15, 2006 and claims priority from Canadian Patent Application Serial No. 2,517,541 entitled Pocket Pager Protector, which was filed on Aug. 29, 2005, all of said applications incorporated herein by reference.

FIELD OF THE INVENTION

The present invention relates to enclosures for wireless devices such as pagers and in particular to hinged waterproof enclosures for such wireless devices.

BACKGROUND OF THE INVENTION

In hospitals and long-term care facilities ("facility"), there has always been a need for a means of communication between a patient's bedside and the nursing care personnel ("nurse") charged with the care and supervision of the patient. In the past, such communication was necessarily effected by means of hard-wired connection between the patient's bedside and the nursing care station. Because the intervening space is typically in a high traffic area, this hard-wired connection frequently had to be routed behind walls and through overhead ducts, which generally entailed considerable installation expense and effort, and was not conducive to upgrade and/or repair.

The advent of wireless telecommunications devices such as pagers has significantly reduced the need for such hard-wired connections, at a reduced cost and resulting in simpler installation and repair, while permitting greater flexibility to the nurses. At the patient bed-side, the call button may be connected (through the telephone system or otherwise) to a transmitter that is programmed to generate a page to a specific and unique telephone number.

Such telephone number is associated with a wireless pager, so that a call from the patient's bedside (patient call) may be communicated to the pager automatically. As with most pager systems, the receipt of a patient call may be communicated audibly, by a visual cue such as a flashing indicator and/or in tactile fashion such as by a vibrating signal. The nurse may manipulate the display of messages and otherwise control the management of the pager by applying pressure to one or more buttons on the face of the pager, or optionally, by applying pressure on designated points of a touch screen display on the pager.

Additionally, the transmitter may optionally be configured to provide certain information, such as the date and time of day, the identification of the patient and/or room and/or bed number and may even be configured to permit a brief text or voice message to communicate the reason for the patient call. More sophisticated systems may permit multiple patient calls, for example from a common ward or floor, to be routed to a single pager, or alternatively, for more than one pager to receive a given patient call.

One of the great advantages afforded by such a wireless system is the portability of the pager. With hard-wired connection systems, the patient call may only be received at the nursing care station, where the receiver is located. In a long-term care and/or hospital facility, the nurses are generally required to travel throughout the facility, in order to deal with patients and their needs. Thus, it is likely that there may be a significant percentage of time that the appropriate nurse is not present at the nursing care station when a patient call is made. Thus, delays in processing the patient call are inherent in such systems.

With a pager-based system, the pager may be held or worn by a designated nurse having responsibility for the patient wherever he or she may be, so that the delay in receiving the patient call is obviated. The range of such pagers is such that the designated nurse may be anywhere within the facility and still receive the patient call.

However, the portability of the pager poses new problems. Typically, the work of nurses requires extension and a large degree of movement. They usually carry one or more objects in their hands and may travel in a hurry and through cramped spaces. Thus, it is not uncommon for pagers to be clipped to uniforms. Despite this precaution, there is a significant possibility that the pager will be dropped.

The problem is compounded by the fact that nurses frequently operate in proximity to water, whether in the form of a therapeutic swimming pool, a bathtub, toilet, sink or bedpan or a spill. Additionally, the nurses are frequently covered in other fluids, such as beverages or even blood and other bodily fluids. If such fluids come into contact with the pager, the delicate electronic circuitry could be irreparably affected.

As well, most facilities eschew the use of carpeting on their floor surfaces for a number of reasons, including issues of hygiene. As a result, in such facilities, the floor surfaces are often hard and bare, such as concrete or hardwood. Thus, the facility tends to be a harsh environment from the point of view of the pagers worn by the nurses.

Because the pagers have a significant per-unit cost, and because the nature of their application requires specific programming and mandates that they remain in operating condition, the cost of a broken pager due to dropping and/or water damage is considerable.

Moreover, as nurses go on and off-shift, it is not uncommon to forget to transfer over equipment used during the shift. In most cases, the equipment is personal to the nurse, or else can be easily substituted when such an omission occurs. However, in the case of the patient call pagers, such an occurrence could have significant deleterious effects. For example, a patient could initiate an urgent patient call, which would only be received by an off-duty nurse, and conceivably a considerable distance away from the facility.

Furthermore, as nurses regularly change wards and areas of responsibility, the portability of pagers may result in improper distribution of the pagers at any given time, again with potentially disastrous consequences.

A number of attempts have been made to provide enclosures for pocket pagers that are water- and/or shock-resistant.

U.S. Pat. No. 6,031,524 issued Feb. 29, 2002 to Kunert discloses a complicated user-replaceable component assembly, which permits replacement of components and devices such as portable electronic devices. An environmental seal is provided around the components to protect the inner circuitry of the electronic device. Shock-resistant mounting of the display panel beneath the keypad and accommodation for the electric connection between the keypad and the portable electronic device's inner circuitry is provided. However, Kunert requires the provision of a keypad on the enclosure, which is electrically connected to and substitutes for the keypad of the portable electronic device.

U.S. Pat. No. 6,646,864 issued Nov. 11, 2003 to Richardson discloses a protective case for an electronic device that has a touch screen. The touch screen is protected with a membrane adapted to the specific contour and profile of the electronic device and allows the user to use a touch screen interface with no shortcomings. The protective case is further adapted to allow infra-red and other communication signals while the device is secured inside the case. Further, electrical connections can be made through the case without affecting the protection afforded the electronic device inside. The enclosure is in the form of a hinged clamshell device with external ribs that prevent torsional stresses thereon and internal foam inserts for shock-relief. Keypad and touch screen input may be through a sheet of thin plastic disposed within an opening in the enclosure and sealed in water-resistant fashion by the interposition of an O-ring between it and the enclosure opening. Thus, in assembling the enclosure, a number of components must be maintained in position simultaneously, which may be problematic, especially in a high-traffic environment such as at a facility.

U.S. Pat. No. 6,659,274 issued Dec. 9, 2003 to Enners discloses a container for a PDA comprising a three dimensional enclosure open at one end and through which the PDA can be inserted. A clear rubber screen is positioned over the touch screen of the PDA, to provide touch point access thereto. The opening in the enclosure can be capped by a cover having an O-ring across an internal projection, which matingly engages with the open end of the cover to provide a water-resistant seal. The rubber screen is integral with or permanently affixed to the enclosure, which provides significant difficulties in construction and precludes the replacement of the screen in the event of a tear or rupture. As well, the use of clear rubber would appear to significantly increase the cost of construction. Furthermore, the material may not be highly conducive to accurate data entry therethrough, or to visibility of the visual outputs of the pager.

U.S. Pat. No. 6,068,119 issued May 30, 2000 to Derr et al discloses a waterproof protective device for holding an apparatus having an interaction field formed from a dimensionally stable protective housing having lower and upper housing parts. The two parts are releasably hingedly connected together and an inside contour of the protective housing is adapted and constructed to closely receive the apparatus with approximately no play. The protective housing is provided with a transparent elastically flexible operating area of reduced wall thickness to enable an interaction field to be viewed and manipulated while encased within the enclosure. A seal is provided between the two parts in the form of a mating circumferential groove and rim, one or both of which may be provided with lips. Derr et al's apparatus renders it awkward to insert the pager into and remove the pager from the enclosure. A separate pusher must be used to urge the pager out of the enclosure.

U.S. Pat. No. 4,836,256 issued Jun. 6, 1989 to Meliconi discloses a shock-proof protective sheath for television remote controls, which comprises a hollow container and holder element, embodied in shock proof material that substantially matches and hugs the external profile of the appliance it encompasses. It is provided with at least two openings, one of which affords access to the remote control's push buttons and the other of which allows passage of the controlled pulses. The window on the front of the sheath, corresponding to the push buttons of the remote control is covered by a thin plastic material, welded or affixed by adhesive strip to the edges of the opening in the sheath, which allows buttons to be pressed while maintaining water tightness. Again, the permanent attachment of the window within the sheath increases the difficulty and cost of construction and precludes easy replacement of the screen in the event of a tear or a rupture.

U.S. Pat. No. 4,901,852 issued Feb. 20, 1990 to King discloses a protective cover for pagers comprising a film of transparent stretchable material (e.g. 595HC silicon plastic) formed to cover the top, four sides and at least a portion of the bottom of a pager. The cover includes accordion-type pleats, which are positioned to reside adjacent switches, a belt clip and the like, to allow operation thereof. While some modicum of watertightness may be provided, subject to the size and positioning of openings in the enclosure, King's enclosure provides no means of shock-resistance.

U.S. Design Pat. No. D455,730 issued Apr. 16, 2002 to Hakim-Nelson discloses a case of a certain dimension adapted to fit the pager, constructed of an entirely transparent material. Protrusions are provided to accommodate push buttons. Access to the enclosure is through a removable door. Again, there appears to be only minimal shock-resistance to Hakim-Nelson's enclosure.

Finally, PCT International Application No. PCT/FI03/00434 published Dec. 11, 2003 in the name of Bordi discloses a case where an electronic device includes a watertight and at least partly transparent case body substantially corresponding to the shape of the electronic device, the case being open at one end, as well as the lid watertightly closing the open end of the case body. It also includes an annular intermediate part on which both the case body and the lid are supported and to which they can be latched. The case body includes an annular supporting surface and the lid includes an annular pressure contact area, so that when closing the lid, the sealing flange is pressed in between the supporting surface and the pressure contact area thereby closing the space defined by the lid and the case body.

SUMMARY OF THE INVENTION

Accordingly, it is desirable to provide an enclosure for a pocket pager or similar device that is water-resistant, of simple construction, and overcomes the disadvantages of the prior art devices noted above, including complexity construction with numerous parts. It is further desirable to provide an enclosure for a pocket pager that is shock-resistant, and preferably also tamper-proof during normal use.

In the discussion of the invention below, references to "pager" should be understood as including any similar device for which the same general requirements of water-resistance, shock-proofing, visibility of display and protection against tampering are applicable.

Still further, it is desirable to provide an enclosure that nevertheless permits the user to conveniently receive the visual, audible and/or tactile outputs of the pager and to provide inputs to the pager while in the enclosure.

Moreover, it is desirable to provide an enclosure that permits easy removal of the pager for maintenance and other purposes, by authorized persons, while being provided with a means to prevent improper access or tampering.

It is also desirable to provide a means for automatically ensuring that the pager is not inadvertently taken out of the designated facility. Moreover, it is desirable to provide a means whereby the region with which a particular pager is to be associated can be easily and quickly identified.

Further, it is desirable to provide such a mechanism at a low cost and with ease of manufacture and simplicity of construction and of assembly and capable of easy and inexpensive repair of broken or ruptured components.

The present invention accomplishes these aims by providing a pager enclosure that comprises an open-topped bottom container, a removable transparent film that spans the top of the container and an annular cover that is removably hinged to the container and can be quickly affixed thereto to seal the film to the container. Optionally, the container can be fitted with an RFID or other passive identification device to identify if the enclosed pager is being transported outside the facility and to trigger an indication to this effect. In particular, an indented portion can be provided within the base, accessible from the interior of the enclosure, for securely receiving a passive identification, or tracking, device.

For additional shock-absorbing protection, optional reinforcements, such as foam inserts, or thickening of the walls of the bottom container, can be provided.

In an embodiment, the cover is fitted with an integral and removable hinge assembly that fits into a slot in the container and that permits the enclosure to be easily opened to insert and remove a pager therefrom. The cover may be constructed of anodized aluminum and coloured to provide visual feedback as to the ward or wing with which it is associated. The cover also provides a means for attachment to the body of the user, such as by an extendible clip.

In an embodiment, a plurality of screws extend through the cover to fix it through the film and to the bottom container.

According to a first broad aspect of the present invention, there is disclosed an enclosure for a wireless device having visual outputs and capable of accepting and processing pressure inputs, the enclosure comprising: (a) a bottom portion with an open top and comprising a base, a pair of opposing side walls and a pair of opposing end walls, each said wall having a substantially planar upper end surface, the bottom portion being adapted to receive and releasably secure the wireless device in a snug fit and to cushion the wireless device from shock; (b) a flexible, tear-resistant transparent film capable of accepting and transmitting pressure inputs to the wireless device, the film being configured to extend over and cover the common plane and be supported by the said walls and to completely cover the wireless device; (c) a removable cover having a lower surface adapted to press the film against the said walls to produce a water-resistant seal about the wireless device; (d) a removable hinge assembly adapted to releasably attach the cover to the bottom portion in hinged engagement; and (e) fixing elements to secure the cover portion about the film and bottom portion.

In a second broad embodiment, the invention seeks to provide a lockable enclosure system for a wireless device, the system comprising (i) an enclosure comprising (a) a bottom portion with an open top and comprising a base, a pair of opposing first and second side walls and a pair of opposing first and second end walls, each said wall comprising a substantially planar upper edge region and a perimetric flange, the first and second side walls and the first end wall each further comprising engagement members extending normally from the flange, the second end wall comprising a protrusion defining a recess region, the bottom portion being adapted to receive and releasably secure the wireless device in a snug fit and to cushion the wireless device from shock; (b) a flexible, tear-resistant transparent film capable of accepting and transmitting pressure inputs to the wireless device, the film being configured to extend over and cover the common plane and be supported by the said walls and to completely cover the wireless device; (c) a removable cover having a lower surface adapted to press the film against the said walls to produce a water-resistant seal about the wireless device and comprising (1) a planar outer surface including a central display aperture; (2) three securing members each extending from a respective one of three outer edges of the cover, the securing members being adapted to lockably engage the first and second side walls and the first end wall of the enclosure; (3) recess regions between the three securing members adapted to receive and engage the engagement members; and (4) a projecting member extending from the fourth outer edge of the cover, adapted to be received in the recess region of the enclosure; and (ii) a lock release tool comprising (a) a base plate configured to be receivable over the cover; (b) three latch members each adapted to engage a respective one of the three securing members; (c) a cam and a plurality of cam followers each cam follower being operatively connected to a respective one of the three latch members; and (d) a rotatable handle operatively connected to the cam to move the cam followers selectively between a minimum engaged position in which the latch members are secured to the removable cover of the enclosure, and a maximum engaged position in which pressure exerted by the cam followers moves the latch members to pull the three securing members away from the enclosure walls to release the cover from the enclosure.

Optionally, the base can be provided with a recess to receive and retain a tracking device which can activate a sensor in the facility, and thereby prevent the inadvertent removal of the enclosure from the facility.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

Figure 1:
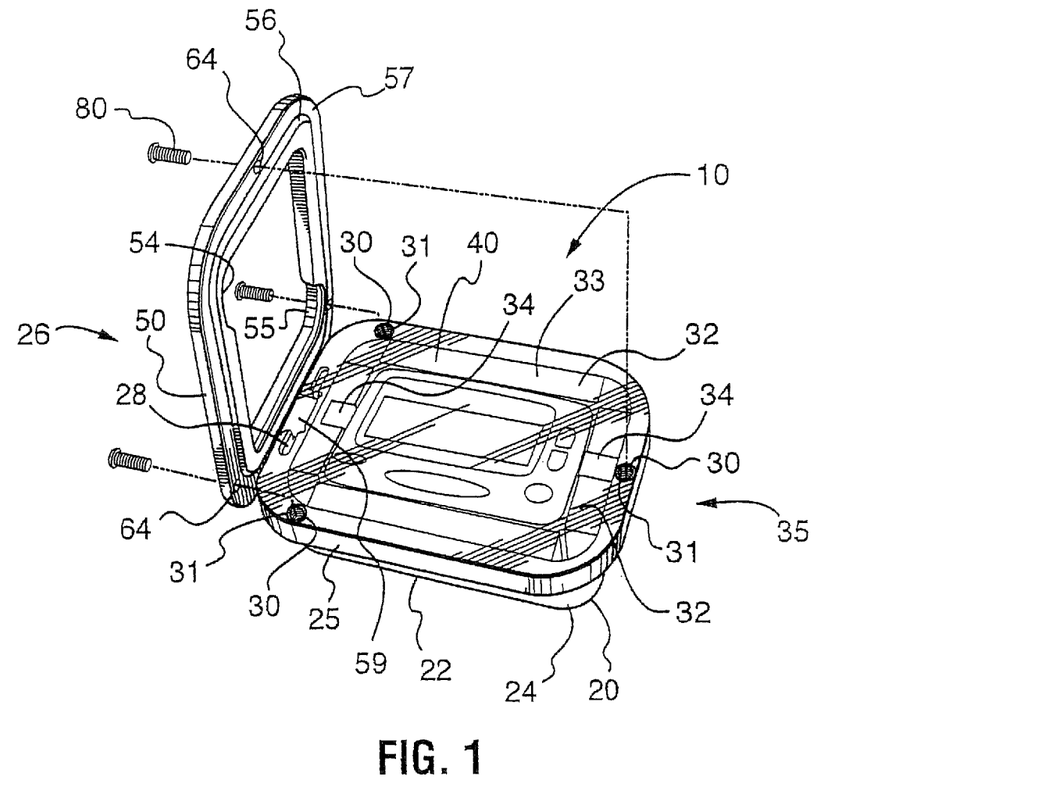
FIG. 1 is a perspective view of the enclosure in accordance with an embodiment of the invention, in use, with the cover in the open position.
Figure 2:
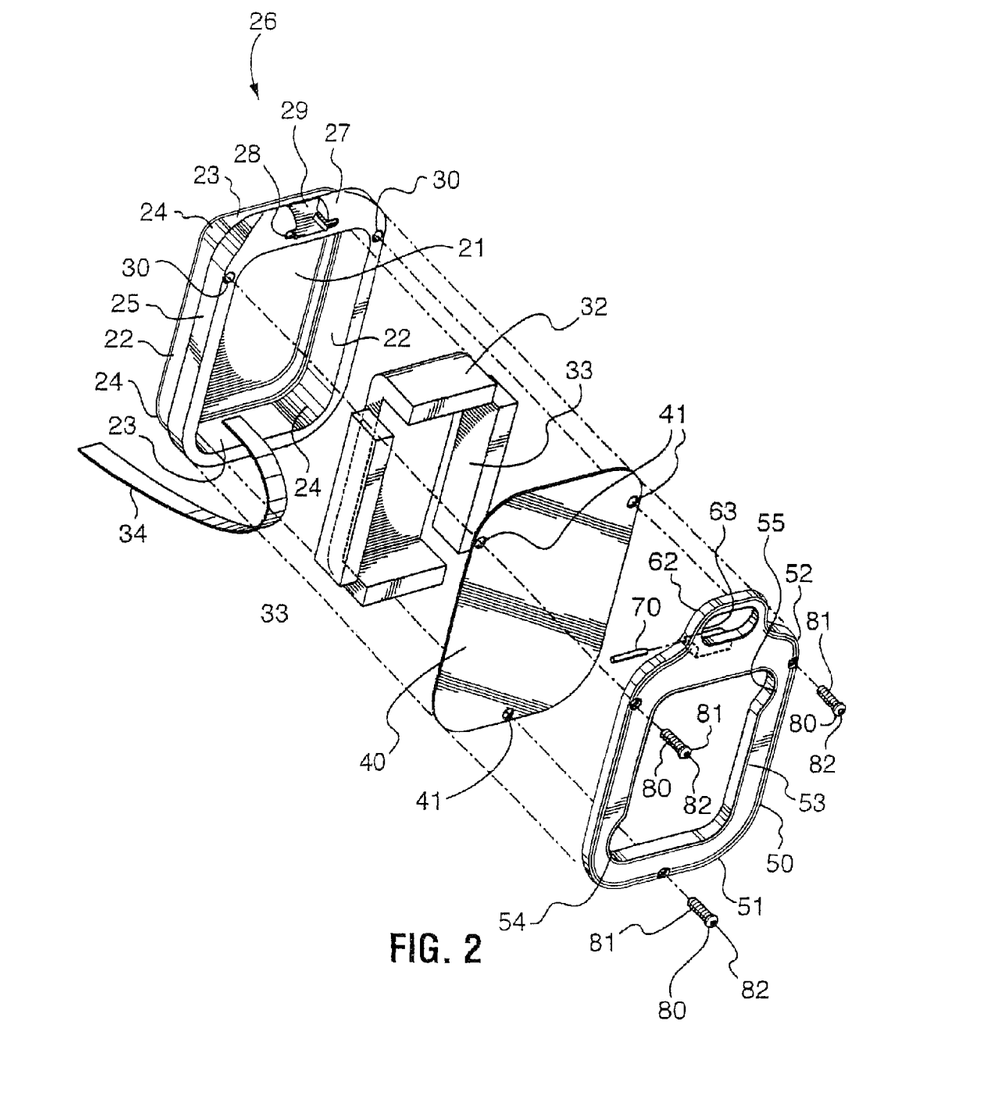
FIG. 2 is an exploded perspective view of the enclosure of FIG. 1.
Figure 2A:
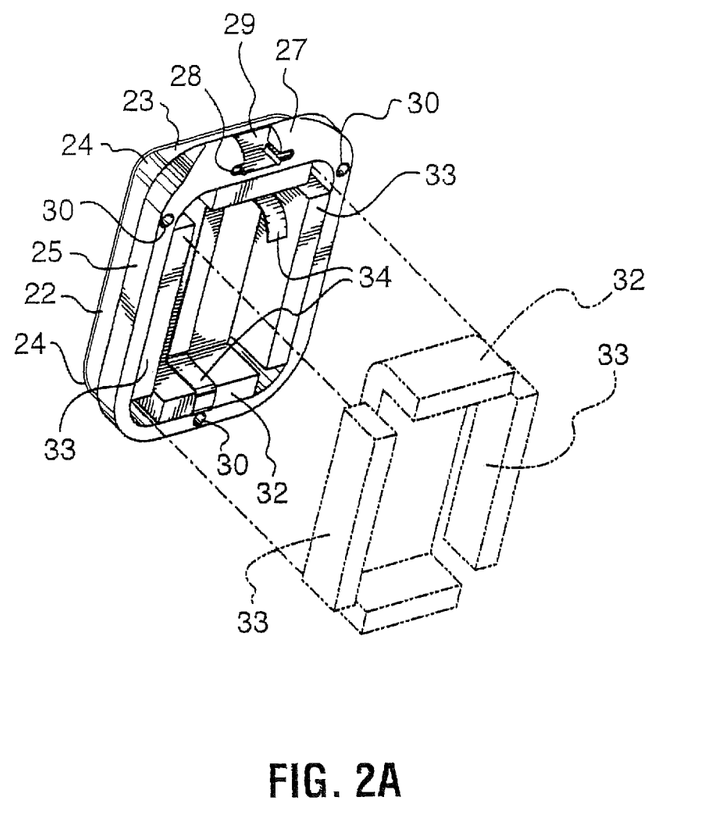
FIG. 2A is a partial exploded perspective view of the bottom container and foam strips of the enclosure of FIG. 1.
Figure 3:
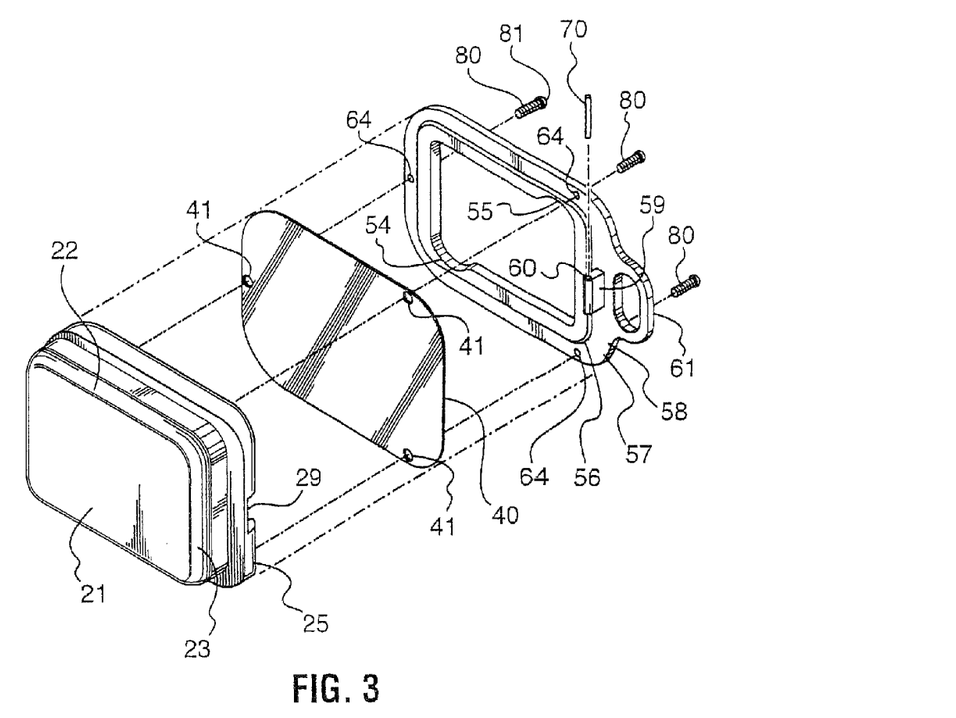
FIG. 3 is an exploded perspective view seen from the bottom of the enclosure of FIG. 1.

Referring to FIGS. 1 to 4, there is shown an enclosure generally at 10, comprising an open-topped bottom container 20, a removable plastic film 40, a removably-hinged cover 50, a hinge pin 70 (FIG. 3) and a plurality of machine screws 80 (FIG. 3).

The bottom container 20 is preferably injection molded out of a suitable thermoplastic such as an acetal copolymer plastic such as is manufactured under the Trade-mark DELRIN. Alternatively, it could be machined out of a light metal, such as aluminum.

The interior dimensions of the bottom container 20 are sized to accommodate and completely surround a pager in a loose fit. In a preferred exemplary embodiment for use with a Commtech model No. 6120 pager, the outer dimensions of the bottom container may be 3.573" long by 2.539" wide by 0.955" high.

The bottom container 20 has a thickened bottom 21 and side 22 and end walls 23. Preferably, the thickness of all three structures is the same. A thickness of 0.059" has been found to be suitable in the above-described exemplary embodiment and is provided by way of example only. The thickened structures 21, 22, 23 provide a measure of shock absorbency in and of themselves.

Both the interior and exterior surfaces of these structures 21, 22, 23 intersect in rounded edges and corners 24, so as to minimize the potential for breakage and stress diffusion upon being dropped. In the above-described exemplary embodiment, the radius of curvature of the rounded edges and corners 24 may be 0.375".

The side 22 and end walls 23 terminate in a lip portion 25 at the open end of the container 20. In the above-described exemplary embodiment, the width and height of the lip 25 may be, by way of example only, 0.157" and 0.315" only. A slight ridge extends vertically along the interior perimeter of the lip 25.

At one end (the "hinge end") 26 of the container 20, the lip 25 is given a curved vertical profile 27. A longitudinal slot 28 extends part way along the hinge end 26 and a trough 29 extends from the curved profile 27 through the middle of the slot 28 and slightly beyond it. In the above-described exemplary embodiment, by way of example only, the curved profile 27 may have a 0.250" radius of curvature, the slot 28 may be 0.787" long and positioned 0.211" from the outer edge of the lip 25 of the end wall 23 of the hinge end 26 and centred therealong. Moreover, by way of example only, the trough 29 may be centred along the end wall 23 at the hinge end 26 and extend inwardly along the lip 25 at a depth of 0.280" to a penetration of the lip 25 of 0.276".

Spaced along the lip 25 is a plurality of bores 30 extending vertically into the lip 25 and partly therethrough. At least one of the bores 30 is positioned on the lip 25 opposite the hinge end 26. Preferably at least one of the bores 30 are positioned along each side wall 22 proximate to the curved profile 27. Preferably, the bores 30 are each filled with an internally threaded insert 31, which may be manufactured of brass or other suitable material such as is known to those having ordinary skill in this art. The threads of the inserts 31 are adapted to accept a suitable machine screw 80. In the above-described exemplary embodiment, the threaded inserts 31 are threaded to accommodate a No. 2 size screw.

The shock absorbency of the bottom container 20 provided by the thickened bottom 21, side 22 and end walls 23 can be enhanced by adding optional inserts, such as an adhesive foam strip 32 along the end walls 23 and bottom 21 of the bottom container 20 and supplementary foam strips 33 extending along each of the side walls 22. The foam strips 32, 33 are each positioned such that they present a straight edge parallel to and substantially coplanar with the top surface of the lip 25 of the bottom container 20. The foam strips 32, 33 can be of any suitable material, preferably a material used for outdoor weatherstripping cut to an appropriate length, or material having similar properties. The foam strips 32, 33 may be, by way of example only, two segments of 1¼" width outdoor weatherstripping of ³⁄₁₆" thickness, such as is sold by TAGO as model TA78537 self-adhesive foam tape, cut to 4.44" and 2.3" lengths respectfully, with the foam strip 33 cut lengthwise in half to supply both side walls 22. In the above-described exemplary embodiment, the interposition of the foam strips 32, 33 will engage the pager in a snug fit within the bottom container so that no surface of the pager protrudes beyond the container lip 25.

However, for many applications, the configuration and materials of construction of the enclosure 10 are such that the optional additional inserts 32, 33 will not be necessary.

Preferably, a ribbon strip 34 may be affixed to the non-hinge end 35 of the bottom container. If the optional foam strip inserts 32, 33 are provided, the ribbon strip 34 can be secured between the foam strip 32 and the end wall 23.

The plastic film 40 is a thin gauge transparent plastic sheet having dimensions approximately equal the length and width of the lip 25 of the bottom container. In the above-described exemplary embodiment, this could be 2.54"×3.37". Preferably, the plastic film 40 is die cut to conform and correspond to the outer perimeter of the lip 25 of the container 20, with holes 41 therein corresponding to the position of the threaded inserts 31 therealong. Suitable plastic film material may be static cling clear vinyl manufactured by Gerber Scientific Products Inc. as model No. AP50823 and having a thickness of 0.007". However, so long as the plastic film 40 is sufficiently flexible to permit keypad button input through it without tearing or rupturing and to permit the visual displays to be read through it, any plastic film material would be satisfactory.

The cover 50 is roughly annularly shaped, the outer perimeter 51 of which conforms and corresponds to the perimeter of the lip 25 of the bottom container 20. Preferably, the top surface 52 of the outer perimeter 51 of the cover 50 is rounded over. A 0.094" radius of curvature for the round over has been found to be suitable in the case of the exemplary embodiment discussed above.

The inner perimeter 53 of the opening in the cover 50 is large enough to accommodate the entire viewing and keypad entry area of the pocket pager. Preferably, the top surface 52 of the inner perimeter 53 is also rounded over, for example, by a 0.094" radius of curvature. In the above-described exemplary embodiment, a button in the lower right corner of the pager extends slightly beyond the profile of the inner perimeter 53 and is accommodated by a concave bulge 54 in the inner perimeter 53. Optionally, a corresponding bulge 55 is provided on the opposite side thereto.

Preferably, the thickness of the cover 50 may be increased slightly along the area 56 of the bottom surface 57 thereof that does not directly correlate to the thickness of the lip 25. A thickness of the cover 50 generally of 0.157" and an increased thickness of 0.039" over the area 56 has been found to be suitable in connection with the above-described exemplary embodiment.

At one end (the "hinge end") 58 of the cover 50, a protrusion 59 extends normally from the bottom surface 57 of the cover 50. The width of the protrusion 59 corresponds to the width of the trough 29 of the bottom container 20 and the height of the protrusion 59 corresponds generally to the length of the trough 29. The protrusion 59 has a bore 60 extending entirely therethrough proximate to its farthest extremity. The diameter of the bore 60 corresponds to the diameter of the hinge pin 70 and may be 0.06".

At the hinge end 58 of the cover 50, there is a stub preferably comprising an annular loop 61 extending outwardly and coplanar with the cover 50. Preferably, the top surface 52 of the outer 62 and inner perimeters 63 of the loop 61 are rounded over in comparable fashion to the outer 51 and inner perimeter 53 of the cover 50.

A plurality of small bores 64 are drilled through the cover 50 at positions and diameters corresponding to the location of the threaded inserts 31 in the bottom container 20.

Preferably, the cover 50 is painted one of a plurality of distinctive colours during the manufacturing process.

The hinge pin 70 is a cylindrical pin adapted to engage the bore 60 of the protrusion 59 of the cover 50 in a snug but sliding fit. The length of the hinge pin 70 corresponds to the length of the slot 28 of the bottom container 20. The hinge pin 70 may be manufactured out of any suitably rigid material such as stainless steel, hardened steel or aluminum. Suitable hinge pins 70 may be manufactured from 18-8 stainless steel of suitable diameter, for example, having regard to the exemplary embodiment described above, of 1/16", such as the 3/4" dowel pin manufactured by McMaster-Carr.

The machine screws 80 are adapted to pass through the bores 64 in the cover 50 and the holes 41 in the plastic film 40, to engage the threaded inserts 31 in the bottom container 20. Preferably, the heads 81 of the machine screws are countersunk with a polygonal or other standardized screwhead socket 82 to permit the screws to be driven by a hex key (not shown) or an Allen key (not shown) of suitable dimension. In the exemplary embodiment described above, Type 316 stainless steel No. 2-56 5/16" hex socket fully threaded machine screws manufactured by McMaster-Carr may be suitable.

Figure 4:
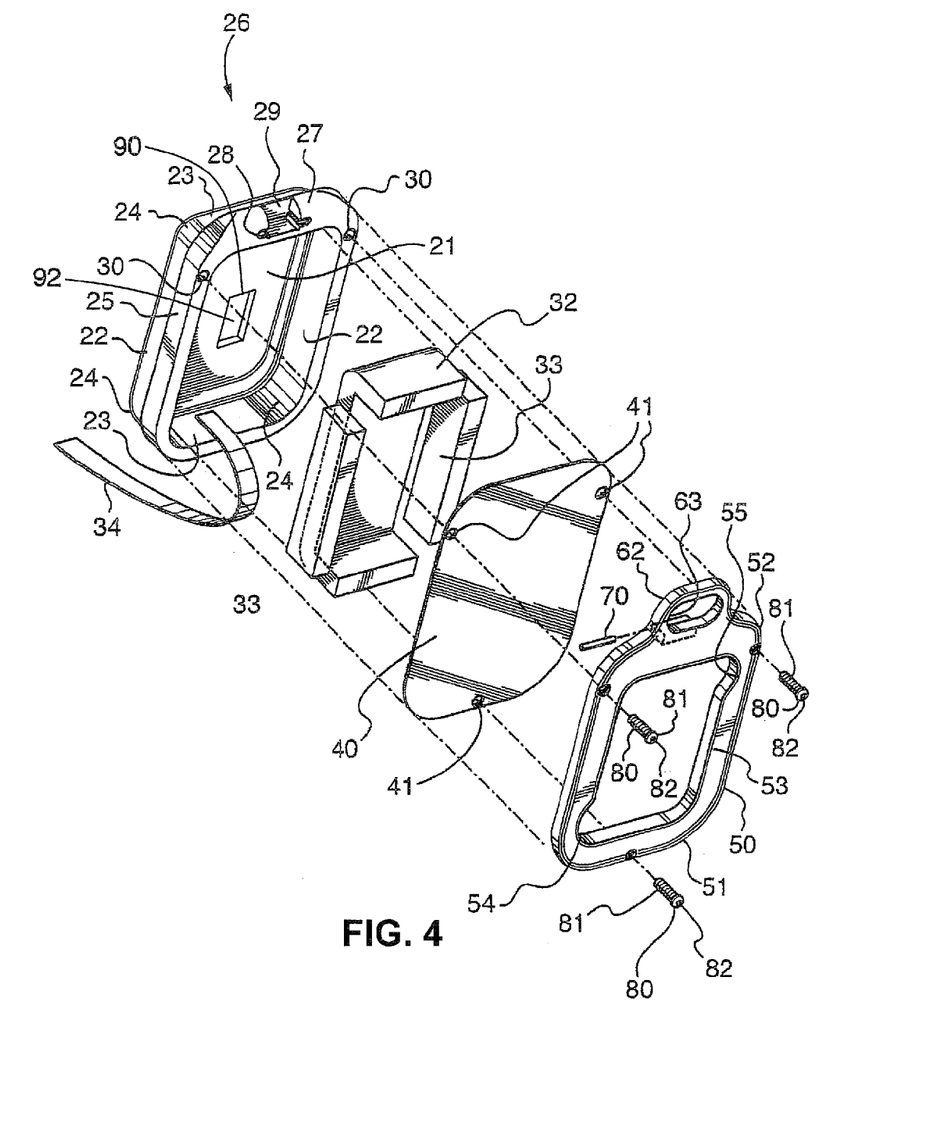
FIG. 4 is an exploded perspective view of a second embodiment of the enclosure of the invention.

Referring further to FIG. 4, optionally a recess 90 cam be provided in the bottom container 20, and a tracking device (not shown) can be secured by any suitable means, preferably removably, onto the base 92 of the recess 90.

The assembly and operation of the present invention may now be described.

Initially, the ribbon strip 34 may be affixed to the end wall 23 of the bottom container 20 at the non-hinged end 35. If the optional foam strips 32, 33 are provided, foam strip 32 is affixed to the two end walls 23 and the bottom 21 of the bottom container 20, taking care to ensure, to the extent possible, that the ends of the foam strip 32 extend roughly parallel and co-planar with the lip 25 or just below it.

Then, the optional foam strips 33 may be affixed in like manner to the side walls 22, again taking care to ensure, to the extent possible, that the upper ends of the foam strips 33 extend roughly parallel and co-planar with the lip 25 or just below it.

Optionally, if the enclosure is provided with recess 90 for receiving a tracking device, a suitable device such as a radio-frequency identification (RFID) tag (not shown) may be affixed to the base 92 of the recess 90 in the bottom container 20 as well.

At this point, the pocket pager may be firmly seated within the padded bottom container 20, with its keypad and display facing up. The ribbon strip 34 may be laid out towards the hinge end 26 and underneath the pager itself. The ribbon strip 34 thus provides a convenient mechanism to enable the removal of the pocket pager from the bottom container 20, in the event that the pager needs to be reprogrammed or replaced, or the batteries need to be changed.

The plastic film 40 may be overlaid on the lip 25 of the bottom container 20, supported by the upper ends of the foam strips and optionally the pager itself. Care is taken to ensure that the holes 41 are aligned with the threaded inserts 31 in the bottom container 20.

The cover 50 may be assembled by inserting the hinge pin 70 into the bore 60 of the protrusion 59. Then the cover and pin assembly may be connected to the container 20 by pushing the protrusion 59 with the pin 70 into the slot 28. The protrusion 59 interacts with the trough 29 and the curved profile 27 of the lip 25 at the hinged end 26 to allow the cover 50 to move from a closed horizontal position in which the cover 50 is aligned with the container bottom 20 to an open vertical position so that the plastic film 40 and the pager can be easily accessed. This opening motion is facilitated by the loop 61 of the stub, which responds to downward pressure by forcing the cover 50 from the closed position to the open position. Throughout, the pin 70 interacts with the slot 29 in order to prevent the cover 50 from moving laterally away from the bottom 20 in the direction pointed to by the loop 61.

Thus, the stub 59 and the pin 70 cooperate with the slot 28, trough 29 and the curved profile 27 of the lip 25 to form a removable hinge assembly from a small number of easily manufactured parts.

With the cover 50 in the closed position, if optional foam strips 32, 33 are provided, the area 56 of the bottom surface 57 that is of increased thickness will come into contact with the upper ends of the foam strips 32, 33 along the side 22 and end walls 23, pinching the plastic film 40 between them and thus providing a strong water resistant seal of the pager enclosure 10.

Finally, machine screws 80 may be inserted through the bores 60 in the cover 50 and the holes 41 in the plastic film 40 and engage the threaded inserts 31 in the container 20. When tightened, the machine screws 80 prevent any upward motion of the cover 50 relative to the container bottom 20 that might admit water into the enclosed area. Additionally, the interposition of the screws 80 precludes the separation of the cover 50 from the container 20, so that the hinge pin 70 will not be misplaced. Finally, the added pressure imparted by the machine screws 80 on the cover 50 against the plastic film 40 and onto the container bottom 20 may contribute to the water resistance of the enclosure 10.

While so installed, the pager may continue to be operated. Visual output may be seen through the transparent plastic film 40 and keypad or other input may be made by pressing on the keys in the normal fashion, except for the interposition of the thin but tear resistant plastic film 40. The use of non-visual outputs such as vibrating annunciators or audio cues may continue to be used while the pager remains in the enclosure. The thickened bottom 21 and side 22 and end walls 23, together with the optional foam strips 32, 33 if used, also contribute to slightly attenuate the volume of such audio cues, which may be very welcome to harried nurses on a busy floor.

To remove the pager from the enclosure 10, for example, to change its batteries, the machine screws 80 need to be removed using a suitable hex or Allen key. When this has been effected, the cover 50 may be lifted to the open position by applying downward pressure on the loop 61. The loop 61 provides leverage to facilitate opening of the cover 50. With the hinge pin 70 tucked inside the slot 28, there is no danger of the stub 59 escaping the trough 29 or the pin 70 being lost. At this point the plastic film 40 can be removed and the pager can be lifted out of the container bottom 20 by pulling upwardly on the ribbon strip 34.

Any needed operations on the pager may then be conducted and the pager replaced in the foam, over the ribbon strip 34. Further, the enclosure 10 may be configured for left- or right-handed use by orienting the pager within the container bottom 20 such that the hinge end 26 of the container 20 lies to the left or right of the pager when properly oriented. The complementary bulges 54, 55 ensure that either orientation may be used without impinging upon the functionality of the pager within the enclosure 10.

The plastic film 40 may then be replaced and the cover 50 shut and properly aligned with the container bottom 20 by pushing the uppermost part of the cover 50 downward and to the non-hinged end 35 of the container bottom 20. Then the machine screws 80 may be re-inserted and tightened to acceptable tolerances.

The enclosure 10 may be attached to the body of nursing personnel by means of a chain, clip, ring or loop (not shown) that may be secured to the loop 61 in well-known fashion. The chain, clip, ring or loop need not be detached from the loop 61 in order to apply downward pressure on the loop 61 to open the enclosure 10 after the machine screws 80 have been removed. Preferably, where the enclosure 10 is to be worn by a nurse who may periodically have contact with an aggressive patient, the chain, clip, ring or loop may be a lanyard cord with a breakage feature (not shown) so as to minimize the risk of damage to nurses' clothing.

The optional introduction of an RFID tag within the bottom container 20 may be combined with sensor technology well-known in the retail sector to trace the position of the pager and optionally, to set off an alarm if the pager is inadvertently or otherwise removed from the premises, such as by posting sensors at all exits from the facility. Indeed, many facilities may already have such sensors installed, so that this functionality can be provided merely by minor software upgrade to the sensor software. Optionally, the sensor technology could be configured to pinpoint the location of the enclosure (and thus the pager and/or the nurse) at any given point in time, within the facility.

Figure 5:
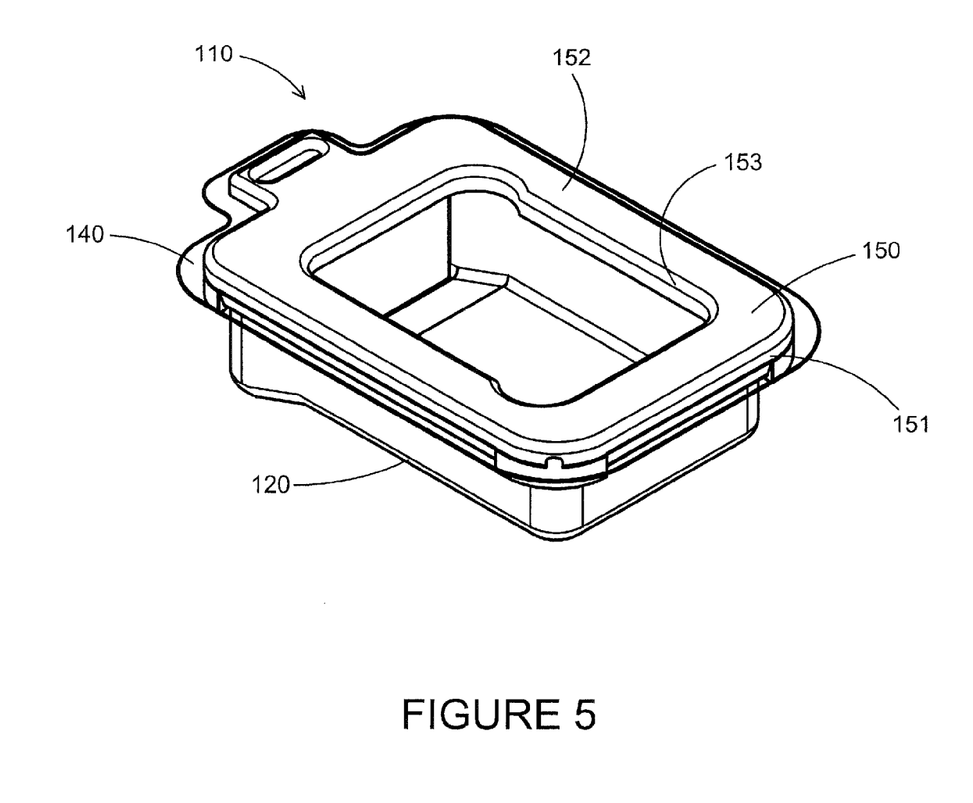
FIG. 5 is a perspective view of the enclosure in an embodiment of the enclosure system of the invention.
Figure 6:
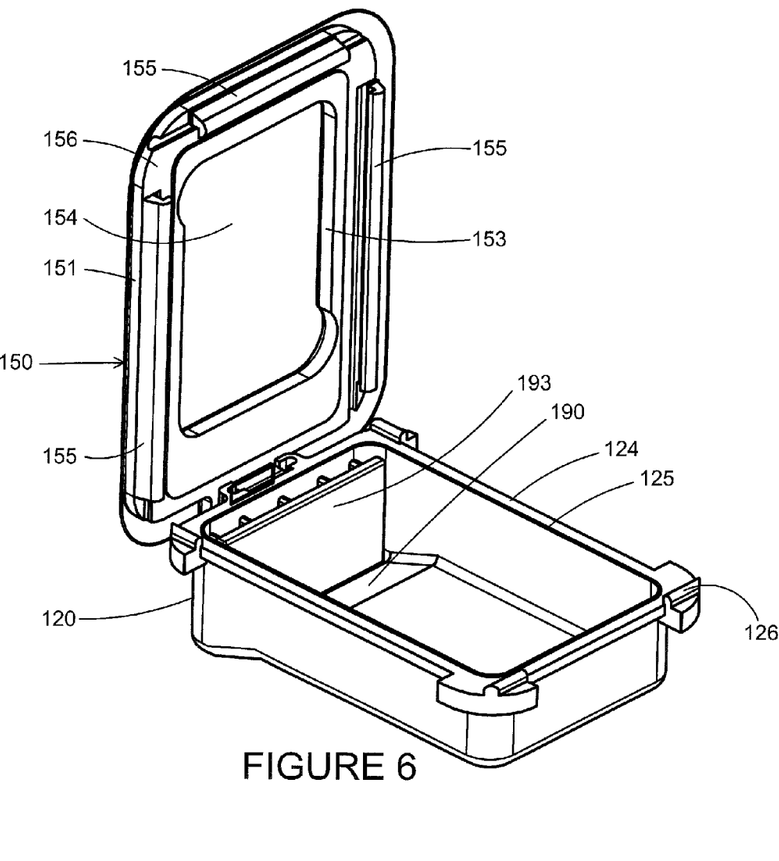
FIG. 6 is a perspective view of the enclosure of FIG. 5 in an opened position.
Figure 7:
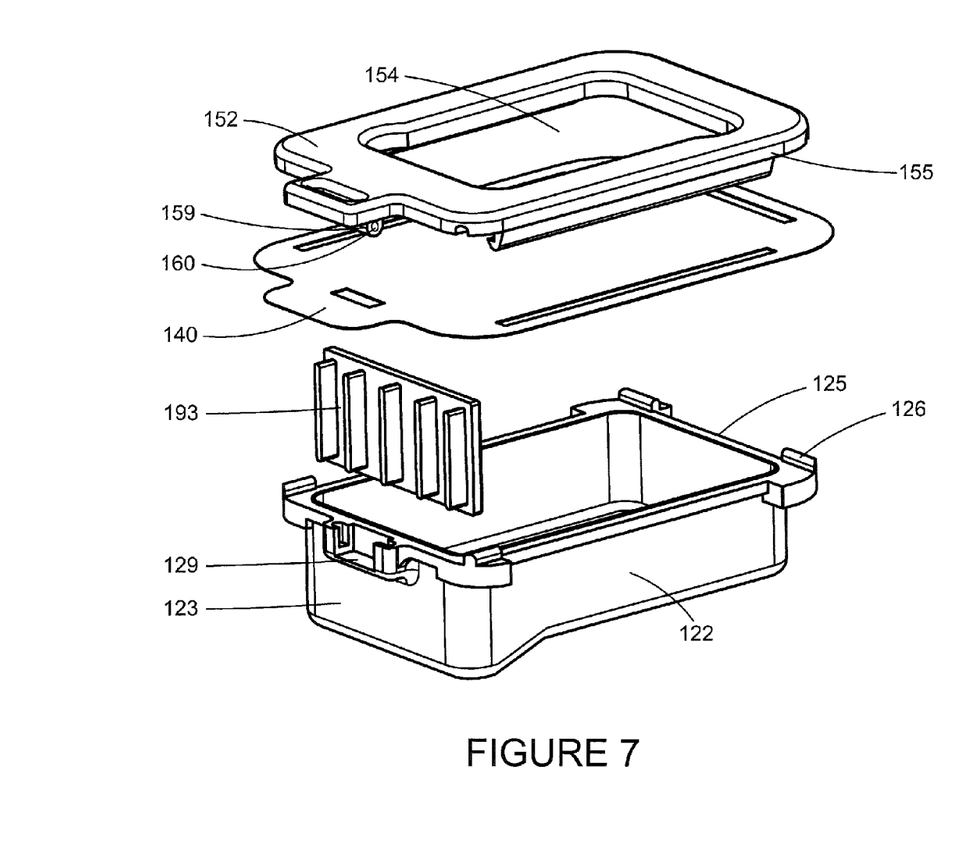
FIG. 7 is an exploded perspective view of the enclosure of FIG. 5.

Referring now to FIGS. 5 to 7, a further embodiment of an enclosure of the invention is shown, designed to be used as an enclosure system, in conjunction with the lock release tool of the invention, discussed in relation to FIGS. 8 to 11 below.

FIGS. 5 and 6 are perspective views of the enclosure of this embodiment, in closed and open positions respectively; and FIG. 7 is an exploded perspective view of the enclosure. Enclosure 110 comprises a substantially rectilinear container 120, having side walls 122 and end walls 123, upper edge region 124, a perimetric flange 125, and engagement members 126 at each of the four corners of container 120. Recess 190 provides for optional divider 193 for securing identification or tracking elements (not shown). Above container 120, waterproof membrane 140 is provided, which can be configured as shown so as to be secured over corresponding profiled areas at upper edge region 124, and thereafter trimmed to size.

Cover 150 comprises outer perimeter 151, top surface 152, and inner perimeter 153 defining aperture 154. As best seen in FIGS. 6 and 7, on three sides of cover 150, securing members 155 extend downwardly, so that on closing enclosure 120, they securely engage perimetric flange 125, to hold enclosure 110 in a closed position, in which membrane 140 is securely retained in the proper position, to provide water-resistance to enclosure 110. Between adjacent securing members 155, recesses 156 are configured to receive engagement members 126. On the fourth side of cover 150, protrusion 159 having longitudinal bore 160 is provided, which is configured to be received within recess 129 in container 120 (see FIG. 7). A pin (not shown) can be inserted through bore 160 to secure protrusion 159 within recess 129.

Referring now to FIGS. 8 to 11, a lock release tool in an embodiment of the enclosure system of the invention is shown.

Figure 8:
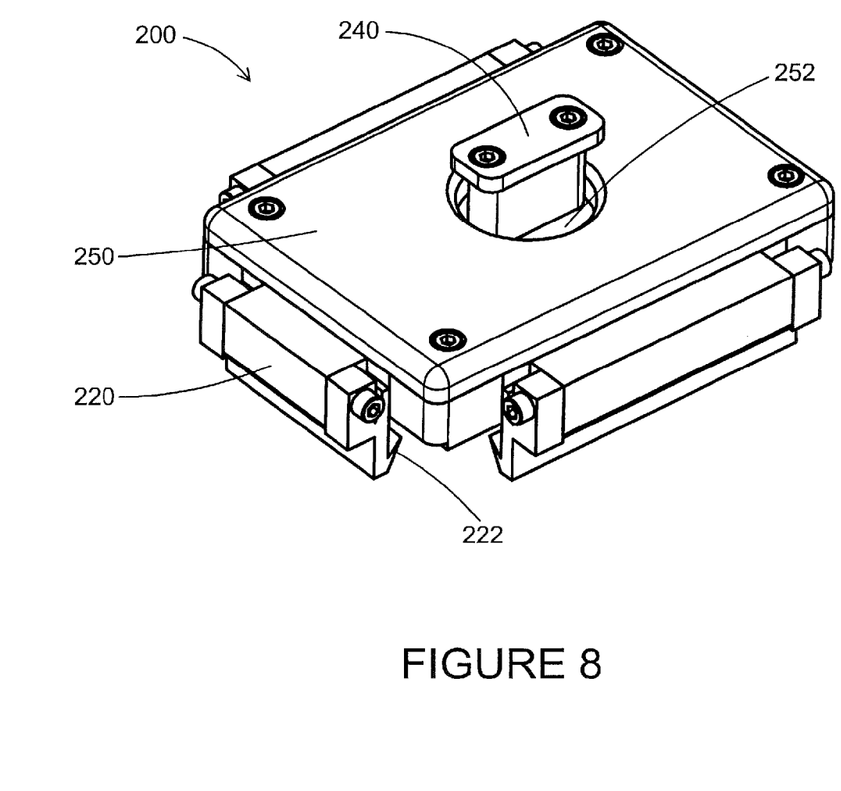
FIG. 8 is a top perspective view of the lock release tool in an embodiment of the enclosure system of the invention.
Figure 9:
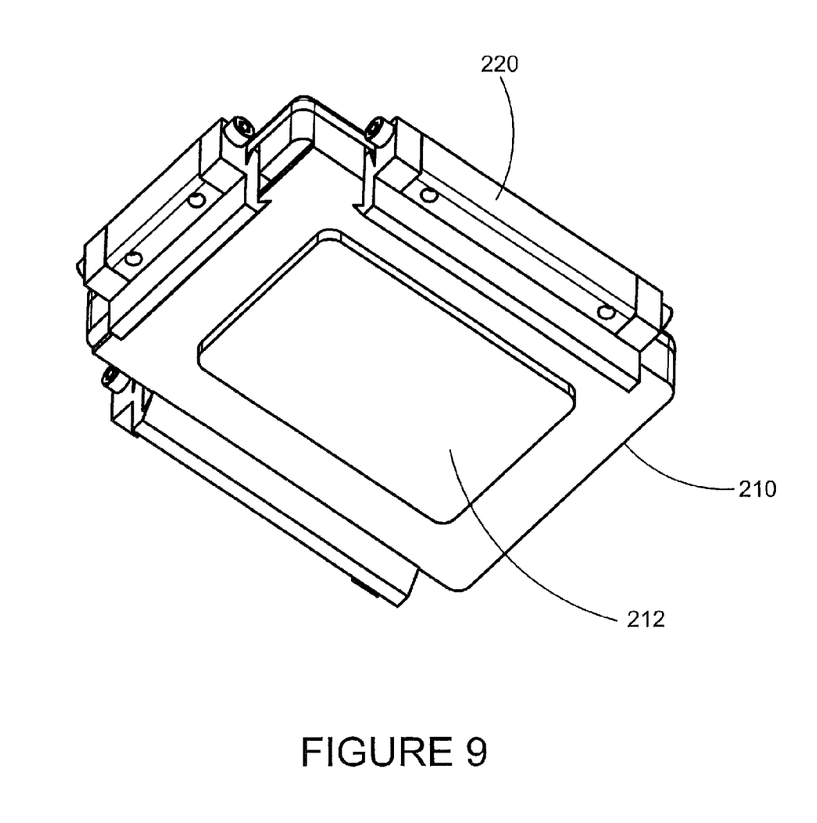
FIG. 9 is a bottom perspective view of the lock release tool of FIG. 8.
Figure 10:
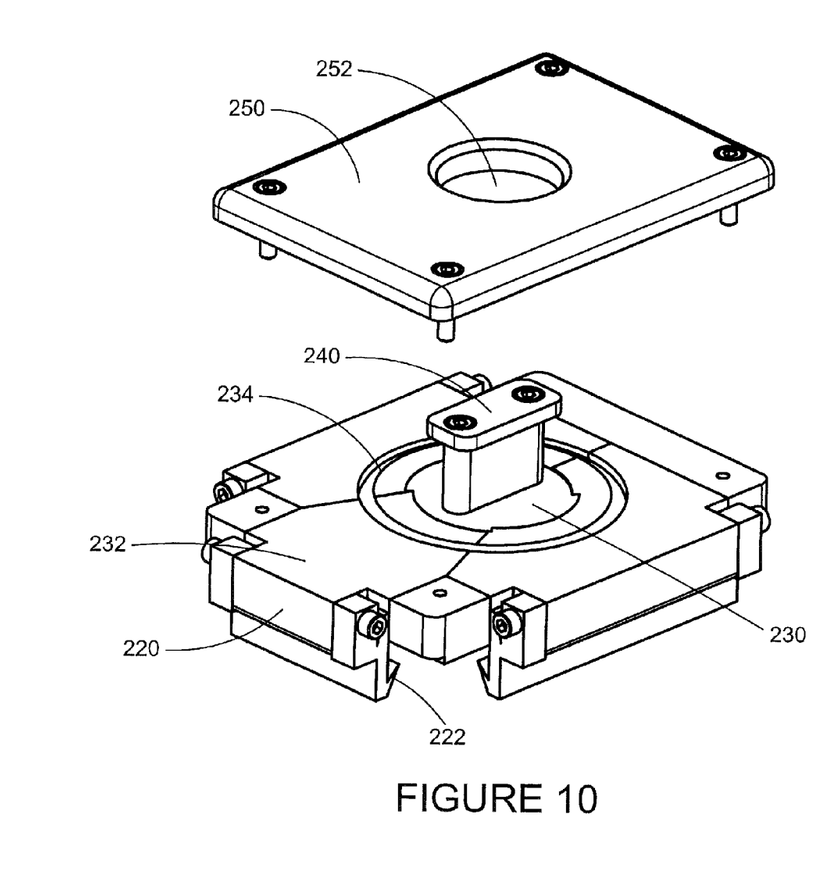
FIG. 10 is a partly exploded perspective view of the lock release tool of FIG. 8.
Figure 11:
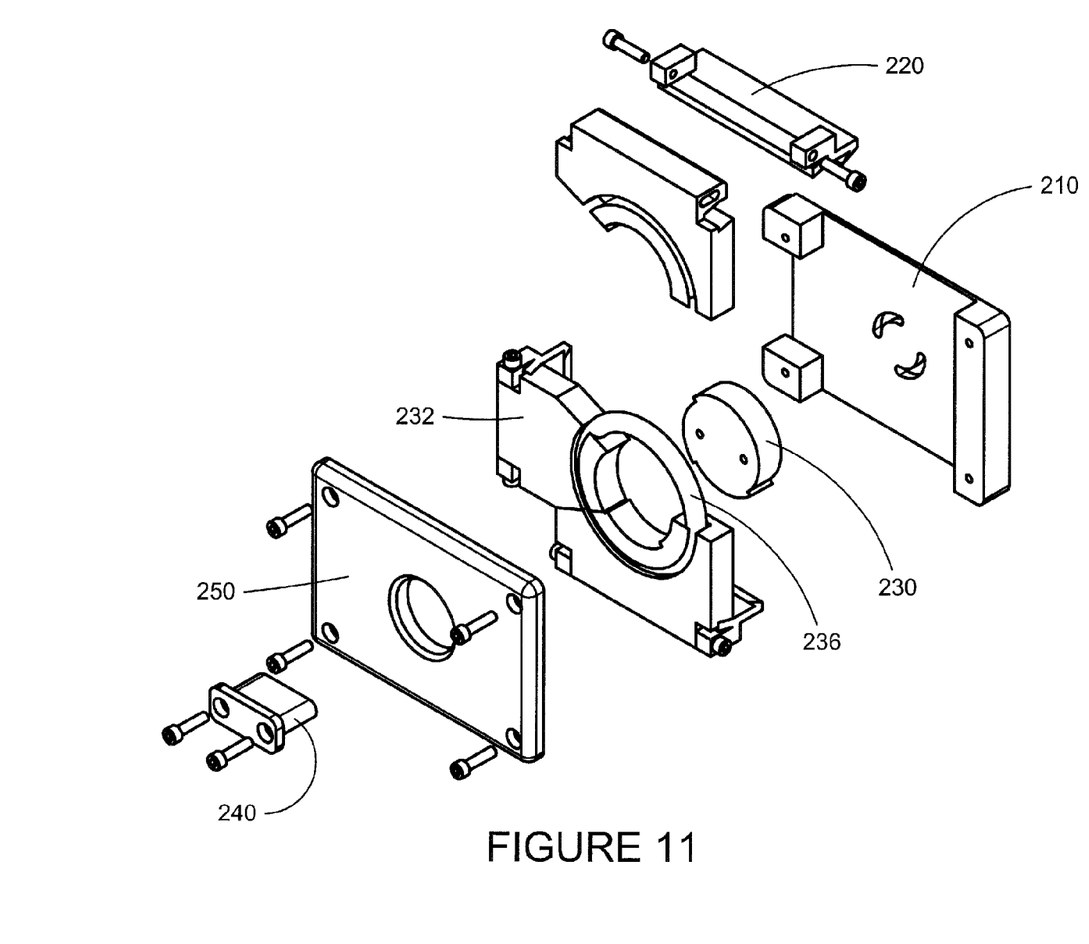
FIG. 11 is an exploded perspective view of the lock release tool of FIG. 8.

FIGS. 8 and 9 are top and bottom perspective views of lock release tool 200, which is configured to be used with enclosure 110 shown in FIGS. 5 to 7. FIGS. 10 and 11 are exploded perspective views of lock release tool 200.

Lock release tool 200 comprises base plate 210, having protruding portion 212, and supporting a cam mechanism, comprising cam 230 and three cam followers 232, which are operatively connected to three latch members 220. Base plate is configured to be compatible with the dimensions and configuration of enclosure 110 (see FIG. 5). Cam 230 is operatively connected to handle 240. At circular region 234, cam followers 232 are secured together by suitable resilient means, such as springs or (as shown in FIG. 11) band 236, which is preferably constructed of an elastomer material. Cover 250 is secured over base plate 210 and the cam mechanism, such that handle 240 is accessible from above cover 250 through aperture 252, and without interference with the operational movement of latch members 220.

In operation, lock release tool 200 is placed over cover 150 of enclosure 110, and base plate 210 located by means of protruding portion 212, which is configured to be compatible with aperture 154 in cover 150 of enclosure 110, so that each of latch members 220 is aligned with one of securing members 155. Latches 222 engage with the lower edges of securing members 155; latches 22 can be of any suitable configuration, such as V-shaped as shown, or a chamfered or otherwise rounded shape, configured to be compatible with a desired configuration of lower edges of securing members 155. Handle 240 can then be turned so that cam 230 acts on cam followers 232, which moves latch members 220 outwards away from base plate 210. This movement applies a pulling force simultaneously to each of securing members 155 by means of latches 222, such that each of securing members 155 is released from perimetric flange 125, and cover 150 can thereby be lifted from container 120 to open enclosure 110 and allow access to its contents.

The simple design of the enclosure and the enclosure system of the invention, including the use of relatively universally available or readily manufactured parts renders the manufacture of the enclosure and the enclosure system straightforward and thus inexpensive.

The relatively few parts and innovative hinging mechanism, and in particular the features of the enclosure system, permit the development of a water-resistant and shock-resistant enclosure for a pager or similar device that can be quickly and easily opened and re-closed in the event of any necessary maintenance operation on the pager, obviating any complicated positioning procedures during assembly or re-assembly.

Despite these operational efficiencies, the inventive enclosure provides substantial water- and shock-resistance, which greatly extends the life of the pagers in the harsh and unforgiving environment of the facility.

Furthermore, the use of colours on the cover 50 provides an easily visually identifiable mechanism by which pocket pagers can be distinguished, for example, those associated with one ward or wing of the facility can be easily identified from other otherwise identical pagers and/or enclosures.

It will be apparent to those skilled in this art that various modifications and variations may be made to the embodiments disclosed herein, consistent with the present invention, without departing from the spirit and scope of the present invention.

For example, the shape, dimension, composition and colour of the container bottom 20 and the cover 50 may be freely altered to accommodate other shapes and kinds of wireless devices in need of water- and shock-resistant protection, such as personal digital assistants (PDAs) and cell phones.

Other embodiments consistent with the present invention will become apparent from consideration of the specification and the practice of the invention disclosed therein.

Accordingly, the specification and the embodiments are to be considered exemplary only, with a true scope and spirit of the invention being disclosed by the following claims.

We claim:

1. A lockable enclosure system for a wireless device, the system comprising (i) an enclosure comprising
- (a) a bottom portion with an open top and comprising a base, a pair of opposing first and second side walls and a pair of opposing first and second end walls, each said wall comprising a substantially planar upper edge region and a perimetric flange, the first and second side walls and the first end wall each further comprising engagement members extending normally from the flange, the second end wall comprising a protrusion defining a recess region, the bottom portion being adapted to receive and releasably secure the wireless device in a snug fit and to cushion the wireless device from shock;
- (b) a flexible, tear-resistant transparent film capable of accepting and transmitting pressure inputs to the wireless device, the film being configured to extend over and cover the common plane and be supported by the said walls and to completely cover the wireless device;
- (c) a removable cover having a lower surface adapted to press the film against the said walls to produce a water-resistant seal about the wireless device and comprising
  - (1) a planar outer surface including a central display aperture;
  - (2) three securing members each extending from a respective one of three outer edges of the cover, the securing members being adapted to lockably engage the first and second side walls and the first end wall of the enclosure;
  - (3) recess regions between the three securing members adapted to receive and engage the engagement members; and
  - (4) a projecting member extending from the fourth outer edge of the cover, adapted to be received in the recess region of the enclosure; and (ii) a lock release tool comprising
- (a) a base plate configured to be receivable over the cover;
- (b) three latch members each adapted to engage a respective one of the three securing members;
- (c) a cam and a plurality of cam followers each cam follower being operatively connected to a respective one of the three latch members; and
- (d) a rotatable handle operatively connected to the cam to move the cam followers selectively between a minimum engaged position in which the latch members are secured to the removable cover of the enclosure, and a maximum engaged position in which pressure exerted by the cam followers moves the latch members to pull the three securing members away from the enclosure walls to release the cover from the enclosure.

2. An enclosure system according to claim 1, wherein the projecting member of the cover includes a bore adapted to receive a hinge pin securable within the recess region of the enclosure.

3. An enclosure system according to claim 2, wherein the hinge pin is removably securable.

4. An enclosure system according to claim 1, further comprising reinforcements secured within the bottom portion and substantially adjacent to each said wall.

5. An enclosure system according to claim 4, wherein the reinforcements comprise compressible material.

6. An enclosure system according to claim 5, wherein the compressible material is a foam strip.

7. An enclosure system according to claim 4, wherein the reinforcements comprise thickened sections of the bottom portion.

8. An enclosure system according to claim 1, wherein the bottom portion of the enclosure further comprises a sub-enclosure adapted to receive an additional device.

9. An enclosure system according to claim 8, wherein the additional device is selected from a passive location identification element and an active tracking device.

10. An enclosure system according to claim 1, wherein the cam followers are retained in alignment by resilient means biased to return the latch members to the minimum engagement position in response to a returning movement of the handle.

11. An enclosure system according to claim 10, wherein the resilient means comprises spring means.

12. An enclosure system according to claim 10, wherein the resilient means comprises a band of elastomer material.

\* \* \* \* \*